2,956,630

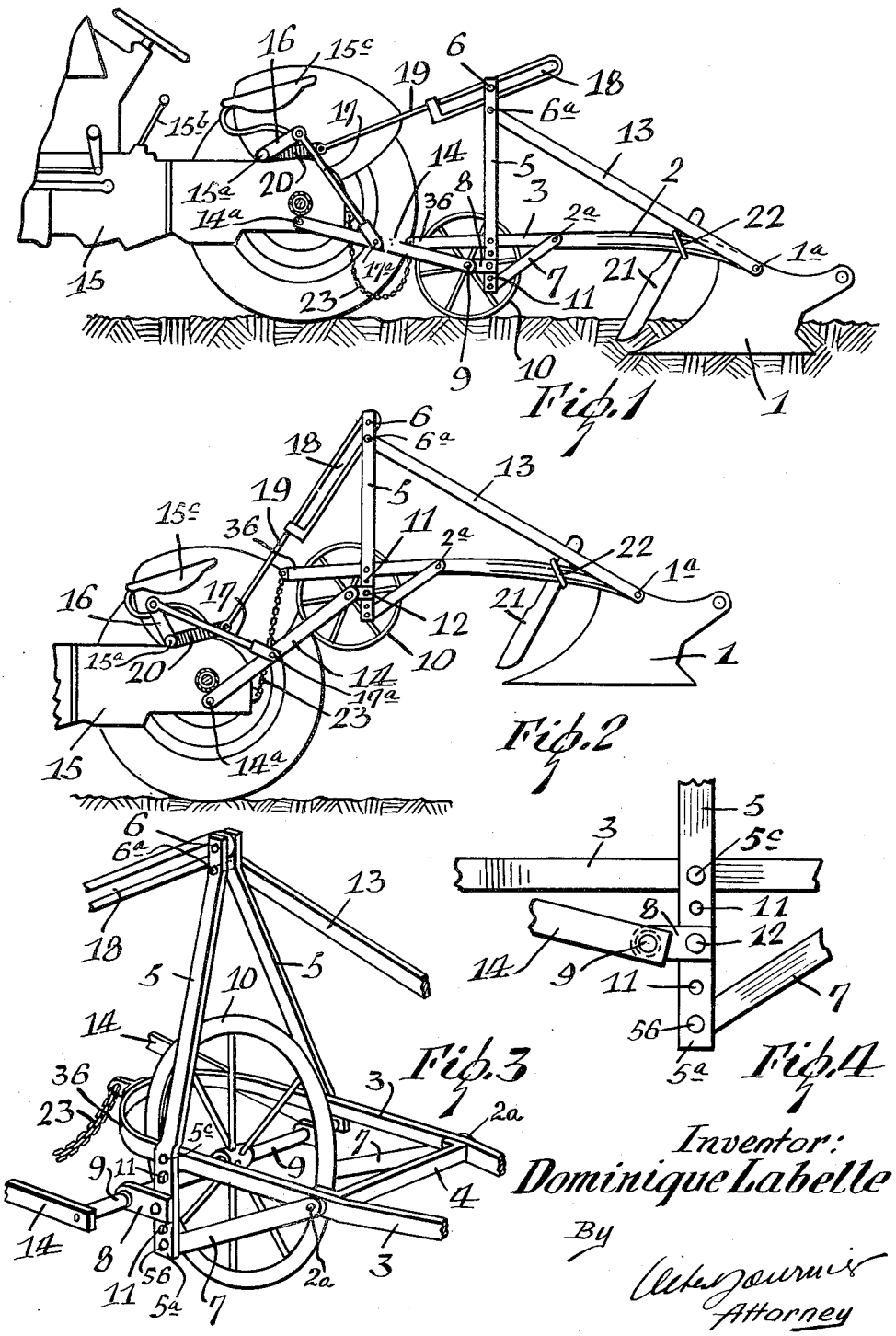

PLOW GUIDE

Dominique Labelle, R.R. 2, Maniwaki, Gatineau County, Quebec, Canada

Filed Feb. 15, 1957, Ser. No. 640,363

1 Claim. (Cl. 172—321)

This invention relates to plows and has special reference to means for regulating the depth of plowing in tractor attached plows.

One important object of this invention is to provide a wheel carrying connection between a plow and tractor, whereby a furrow of uniform depth may be produced as the plow is drawn forwardly by the tractor.

Another important object of this invention is to provide a novel connection between a plow and a tractor, whereby the plow may be lifted clear of the ground for transportation from place to place as desired.

A third important object of this invention is to provide a novel connection between a plow and a tractor, which connection is adjustable to permit a selection of plow working depth suitable to the character of the soil being plowed.

With the above and other objects in view, as will presently be apparent, the invention consists in general of certain novel arrangements of elements and combinations of parts hereinafter fully described, illustrated in the accompanying drawings, and particularly claimed.

In the drawings, like characters of reference indicate like parts in the several views, and:

Figure 1 is a side elevation of the invention with the plow shown in plowing position;

Figure 2 is a side elevation of the invention with the plow shown as raised above the ground;

Figure 3 is a fragmentary perspective view showing the manner of supporting a ground wheel used herein; and Figure 4 is an enlarged detail of certain connecting means between the plow and tractor, whereby the depth of plowing may be regulated.

The plow itself is shown at 1 and is of the ordinary form. To this plow, there is rigidly fixed a forwardly projecting bar 2, which takes the place of the usual draw bar. An extension is secured to the forward end of the bar 2, which consists of a pair of side members 3, which diverge forwardly from the bar 2. Side members 3 are maintained spaced apart by means of a cross-tie 4, the ends of which are secured to the members 3 by means of bolts 2a. Forward of the bolts 2a, the members 3 are extended in parallelism and have their forward ends joined by a U-shaped portion 36 to form a loop. Extending convergingly upward from the forward ends of the parallel portions of the extensions 3, is a pair of supports 5, which have parallel upper ends connected by upper bolts 6 and lower bolts 6a. The members 5 are connected to the members 3 by bolts 5c and have downwardly extending parallel portions 5a, which are connected at their lower ends by braces 7, running from the bolts 2a to bolts 56. The members 3 and 5 are connected by bolts 5c, and between the bolts 5c and 56, the members 5a are provided with vertically spaced bolt holes 11, for the selective reception of bolts 12. Forwardly projecting ears 8, are secured to the members 5a by these bolts 12, and these ears carry bearings in which is mounted a shaft 9, carrying a centrally disposed ground engaging wheel 10. The upper ends of the members 5 are connected to the plow 1, by a rearwardly and downwardly extending brace 13 which runs from the bolt 6a, to a bolt 1a, connecting the brace to the plow.

On each side of the tractor 15, is a tractor draw bar 14, which has its forward end pivotally mounted on the tractor frame by a bolt 14a. The rear ends of the bars 14 are mounted rotatably directly on the shaft 9, outside of the ears 8, and thus effect draft on the plow by means of connections through the upstanding members 5a the members 3, and the plow draw bar 2. Furthermore, the structure formed by the parts 2, 3, 5, 7 and 13, is a rigid and inflexible linkage or frame carrying the wheel 10.

In the tractor 15, there is provided a rock shaft 15a, having at each end a rock arm 16, fixed thereon. The usual tractor mechanism (not deemed necessary here to be shown as the same is well known) causes the rock shaft to be oscillated at will. A valve handle 15b, controllable from a tractor seat 15c, is used to control the extent and direction of oscillation of the shaft 15a. Pivotally connected to the free end of each rock arm 16, is one end of a link 17, which has its other end connected to a tractor draw bar 14, intermediate the ends of the latter by a bolt 17a. It will now be seen that oscillation of the rock arm 16 between the positions shown in Figures 1 and 2, will effect movement of the rigid frame carrying the wheel 10, in like manner between the positions shown in these figures.

In order to enable the wheel 10 to follow inequalities of the ground, there is provided a guide bar 18 which has its ends connected to a link 19, so that the bar and link provide a slot for the bolt 6. A coiled tension spring 20, connects the link 19 to the tractor 15. As shown in Figure 1, when the plow is in the ground, the bolt 6 will rest intermediate the ends of the guide slot between the members 18 and 19, but when the plow is raised, the bolt 6 will be engaged at the upper end of this slot whereby the entire plow assembly is maintained clear of the ground in substantially horizontal position.

When the link 17 is moved to a forward position the member 14 will be swung from the position shown in Figure 1 to the position shown in Figure 2. This will bodily raise the shaft 9 and since this shaft is journaled in bearings rigidly fixed to the members 5 the rigid frame carrying the plow will be raised upwardly and by the action of the members 19 and 20, as shown in Figures 1 and 2, the rear end of the frame carrying the plow will be held raised.

If desired, a coulter 21 may be fixed to the bar 2 by a U-bolt 22, and a safety chain 23 may connect the extension 36 to the tractor 15. If desired, chain 23 may entirely replace members 18 and 19 for maintaining the plow assembly in upper position. In this case, members 5 and 13 can also be dispensed with. From the foregoing it will be clear that the plow assembly of the present invention is flexibly connected to the tractor and yet can be bodily lifted clear of the ground. It will be noted that the flexible connection between tractor and plow is obtained because the tractor draw bars 14 are pivotally connected to the shaft 9 of guide wheel 10 whereby no torque is exerted by the draw bars 14 on the plow assembly during pulling by the tractor. Thus depth control is made independent of the tractor pulling force and only depends on the lever arrangement between wheel 10 and plow 1.

Although a specific embodiment of the invention has been illustrated and described, it will be understood that various alterations in the details of construction may be made without departing from the scope of the invention as indicated by the appended claim.

What I claim is:

In combination, a tractor having laterally spaced draw bars pivoted at the back thereof, power actuated rock arms and links connecting said rock arms to said draw bars for positively raising and lowering said draw bars, and a plow assembly comprising a plow, a plow draw bar to the rear end of which said plow is rigidly secured, laterally spaced side members constituting a rigid forward extension of said plow draw bar, said side members joined at their forward end to form a loop, upright members secured to said side members in laterally aligned spaced relationship from each other, said upright members extending downwardly and upwardly from said side members, ears secured to said upright members below said side members and means on said upright members for selectively attaching said ears to said upright members in a plurality of vertically spaced positions to adjust the vertical level of said ears with respect to said side members, the free ends of said ears providing bearings, a transverse shaft journaled in said bearings, a ground engaging wheel supported on said shaft between said upright members and said side members, said shaft projecting laterally outwardly of said ears to form end portions directly pivotally connected to the free ends of the tractor draw bars, the upper ends of said upright members being joined together, a brace rigidly connecting said upper ends and the rear end of said plow draw bar to form a rigid unit, and a link pivotally connected at one end to said tractor at a point above the pivotal connections of said tractor draw bars to said tractor, said link having at its other end a lost motion pivotal connecting means connected to the joined upper ends of said upright members, said lost motion connecting means being inoperative in the lower position of said tractor draw bars and operative to exert a tension on said plow assembly to maintain the latter clear of the ground in the raised position of said tractor draw bars, whereby during pulling of said plow assembly by said tractor through said tractor draw bars while said plow assembly is in lowered ground engaging position, said plow assembly can pivot freely about said shaft.

References Cited in the file of this patent

UNITED STATES PATENTS

| | | |
|---|---|---|
| 1,207,430 | Nilson | Dec. 5, 1916 |
| 2,456,693 | Fraga | Dec. 21, 1948 |
| 2,684,021 | Ratzlaff | July 20, 1954 |

FOREIGN PATENTS

| | | |
|---|---|---|
| 145,289 | Australia | Mar. 17, 1949 |
| 1,013,113 | France | Apr. 30, 1952 |
| 937,381 | Germany | Jan. 5, 1956 |
| 241,351 | Switzerland | July 16, 1946 |